US012565280B2

(12) United States Patent
Chang

(10) Patent No.:  US 12,565,280 B2
(45) Date of Patent:  Mar. 3, 2026

(54) HANDLE COMPONENT FOR ELECTRIC BICYCLE

(71) Applicant: Wei-Yueh Chang, Taichung (TW)

(72) Inventor: Wei-Yueh Chang, Taichung (TW)

( * ) Notice: Subject to any disclaimer, the term of this patent is extended or adjusted under 35 U.S.C. 154(b) by 400 days.

(21) Appl. No.: 18/476,977

(22) Filed: Sep. 28, 2023

(65) Prior Publication Data

US 2025/0108876 A1     Apr. 3, 2025

(51) Int. Cl.
 *B62K 11/14*       (2006.01)
 *B62J 45/413*      (2020.01)

(52) U.S. Cl.
 CPC .............. *B62K 11/14* (2013.01); *B62J 45/413* (2020.02)

(58) Field of Classification Search
 CPC ......... B62K 11/14; B62K 23/04; B62J 45/413
 See application file for complete search history.

(56) References Cited

U.S. PATENT DOCUMENTS

| | | | | | |
|---|---|---|---|---|---|
| 5,660,083 | A | * | 8/1997 | Huang | B62M 25/04 |
| | | | | | 74/489 |
| 6,055,882 | A | * | 5/2000 | Arbeiter | B62M 25/04 |
| | | | | | 264/513 |
| 2010/0126299 | A1 | * | 5/2010 | Baldassari | F02D 11/10 |
| | | | | | 74/491 |

FOREIGN PATENT DOCUMENTS

| | | | | | |
|---|---|---|---|---|---|
| DE | 102019121987 | A1 | * | 10/2020 | ............. B62K 23/04 |
| EP | 1238899 | B1 | * | 12/2007 | ............. B62K 23/04 |
| JP | 2002302091 | A | * | 10/2002 | ............. B62M 25/04 |
| TW | 200806528 | A | * | 2/2008 | |
| WO | WO-2011152469 | A1 | * | 12/2011 | ............. B62K 23/04 |

\* cited by examiner

*Primary Examiner* — Drew J Brown
(74) *Attorney, Agent, or Firm* — RABIN & BERDO, P.C.

(57)       ABSTRACT

A handle component for an electric bicycle has a shifter body, a throttle body, a shifter handle, a resilient element connected to the throttle body and the shifter body, and a control module. The shifter body has a shell and a cover; the shell has a mounting groove and a mounting cylinder respectively formed on its two opposite sides, and the cover is connected to the shell and covers a groove opening of the mounting groove. The throttle body is disposed inside the mounting groove and is configured to be rotated relative to the shifter body. The shifter handle is rotatably sheathed on the mounting cylinder, and the control module is configured to sense rotation of the throttle body to control a motor. By integrating the shifter body and the throttle body, a length of the handle component can be shortened for improving convenience and safety.

9 Claims, 11 Drawing Sheets

HANDLE COMPONENT FOR ELECTRIC BICYCLE

BACKGROUND OF THE INVENTION

1. Field of the Invention

The present invention relates to an electric bicycle, and particularly to a handle component for an electric bicycle.

2. Description of Related Art

An electric bicycle is a bike having batteries as an assisting driving energy and has a motor, a controller, the batteries, controlling components such as a shifter and a throttle, and an instrument system added on a base of a normal bicycle. With the throttle and the shifter mounted on a handlebar, the electric bicycle allows riders to shift the gear by the shifter and allows the bicycle to be completely driven by electricity, which brings convenience and pleasure for people's work and life.

In a conventional electric bicycle on the market, the throttle and the shifter are two independent components, each having a shell for protecting interior configurations. Thereby, after mounting on the handlebar, a distance between the shifter and a trigger of the throttle can be too large for operation. If a rider steadily grips the shifter, then pressing the trigger of the throttle by the thumb of the rider can be difficult; if the rider presses the trigger of the throttle, then the rider cannot hold the shifter steadily and may be late for braking, which causes risks in safety.

To overcome the shortcomings of the conventional electric bicycle, the present invention provides a handle component for an electric bicycle to mitigate or obviate the aforementioned problems.

SUMMARY OF THE INVENTION

The main objective of the present invention is to provide a handle component for an electric bicycle that integrates a shifter and a throttle, shortens moving distances of fingers during operation, and thus lowers risks of riding the electric bicycle.

The handle component for an electric bicycle has a shifter body, a throttle body, a shifter handle, a resilient element, and a control module. The shifter body has a shell and a cover; the shell has two opposite sides and has a mounting groove formed on one of the two opposite sides and a mounting cylinder formed on the other one of the two opposite sides. The shell has a protruding cylinder formed inside the mounting groove and an arc-shaped groove recessed on a bottom of the mounting groove. The cover is connected to the shell and covers a groove opening of the mounting groove. The throttle body is disposed inside the mounting groove, is sheathed onto the protruding cylinder, and is configured to be driven by an external force to be rotated relative to the shifter body. The throttle body has a sliding block inserted into the arc-shaped groove and configured to move along and be limited in the arc-shaped groove when the throttle body is rotated relative to the shifter body. The shifter handle is rotatably sheathed onto the mounting cylinder, and the resilient element is connected to the shifter body and the throttle body and is configured to rotate the throttle body relative to the shifter body. The control module is disposed to the shifter body or the throttle body and is configured to sense rotation of the throttle body relative to the shifter body to control a motor to operate.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
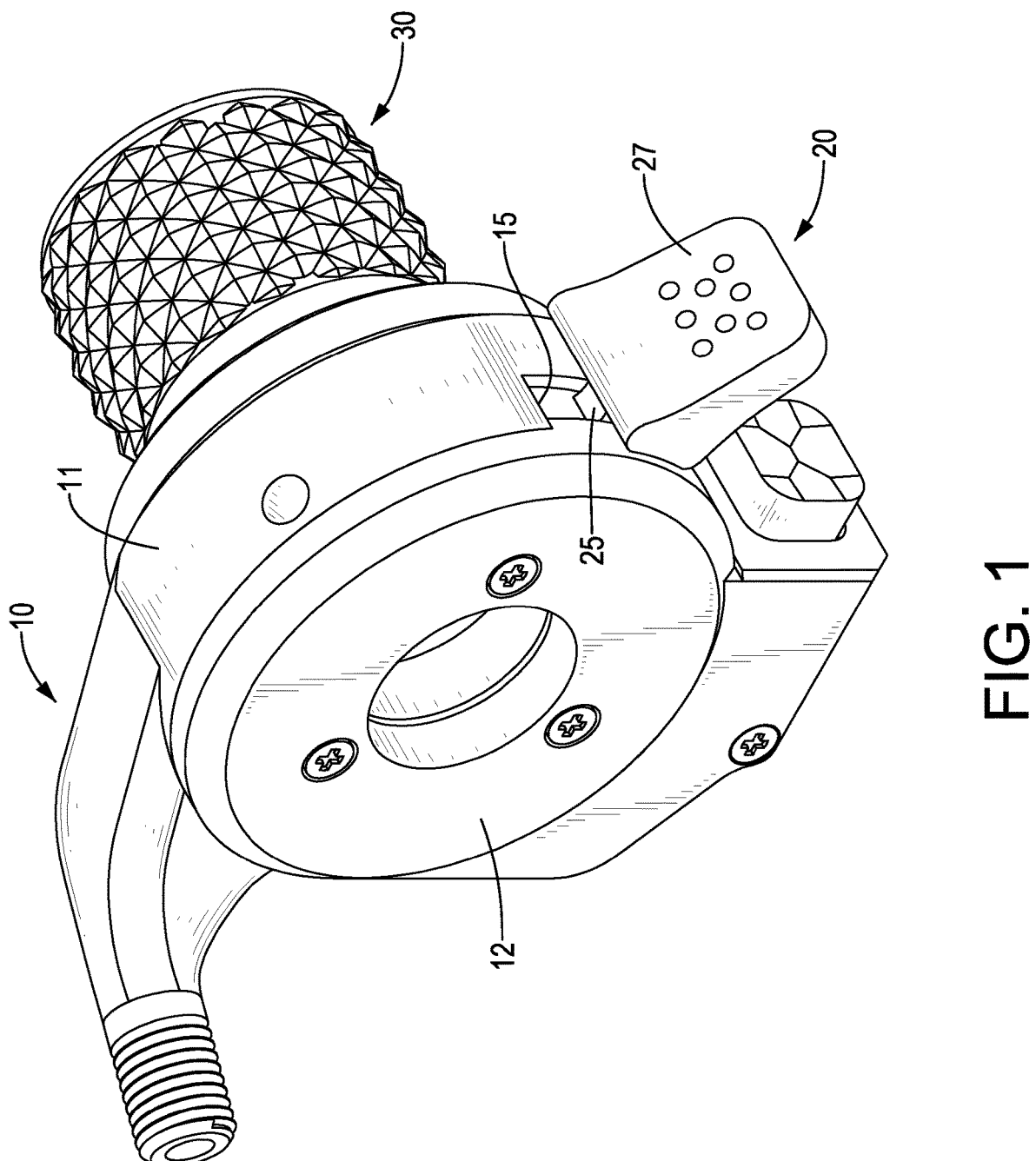
FIG. 1 is a perspective view of a handle component for an electric bicycle of a preferred embodiment in accordance with the present invention.

With reference to FIGS. 1 to 3, and 6, a handle component for an electric bicycle of a preferred embodiment in accordance with the present invention has a shifter body 10, a throttle body 20, a shifter handle 30, a resilient element 40, and a control module 50. The throttle body 20 is rotatably disposed inside the shifter body 10, and the shifter handle 30 is disposed on the shifter body 10. The resilient element 40 is connected to the shifter body 10 and the throttle body 20. The control module 50 is configured to sense rotation of the throttle body 20 relative to the shifter body 10 to control the electric bicycle.

Figure 2:
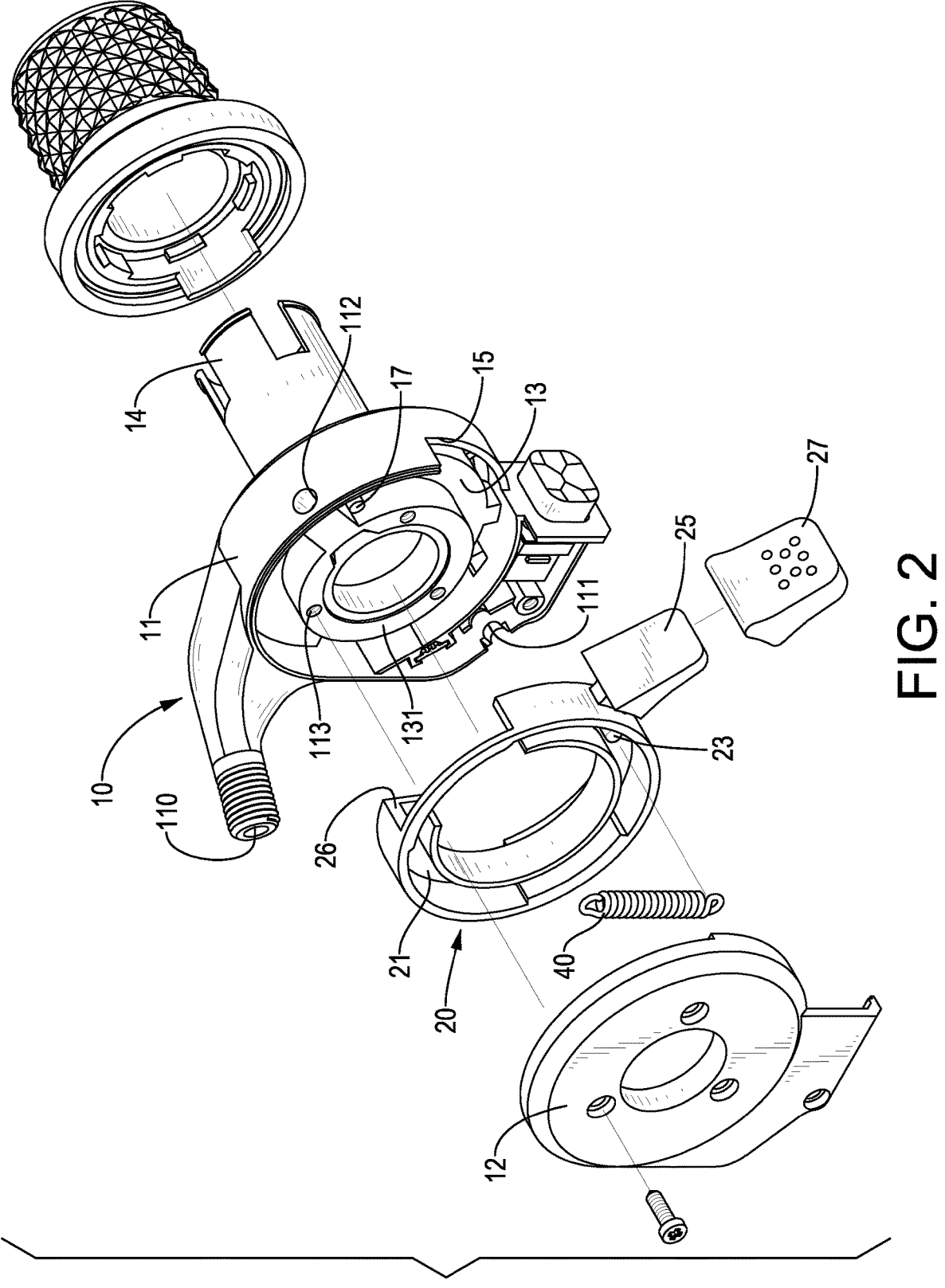
FIG. 2 is an exploded view of the handle component for an electric bicycle in FIG. 1.
Figure 3:
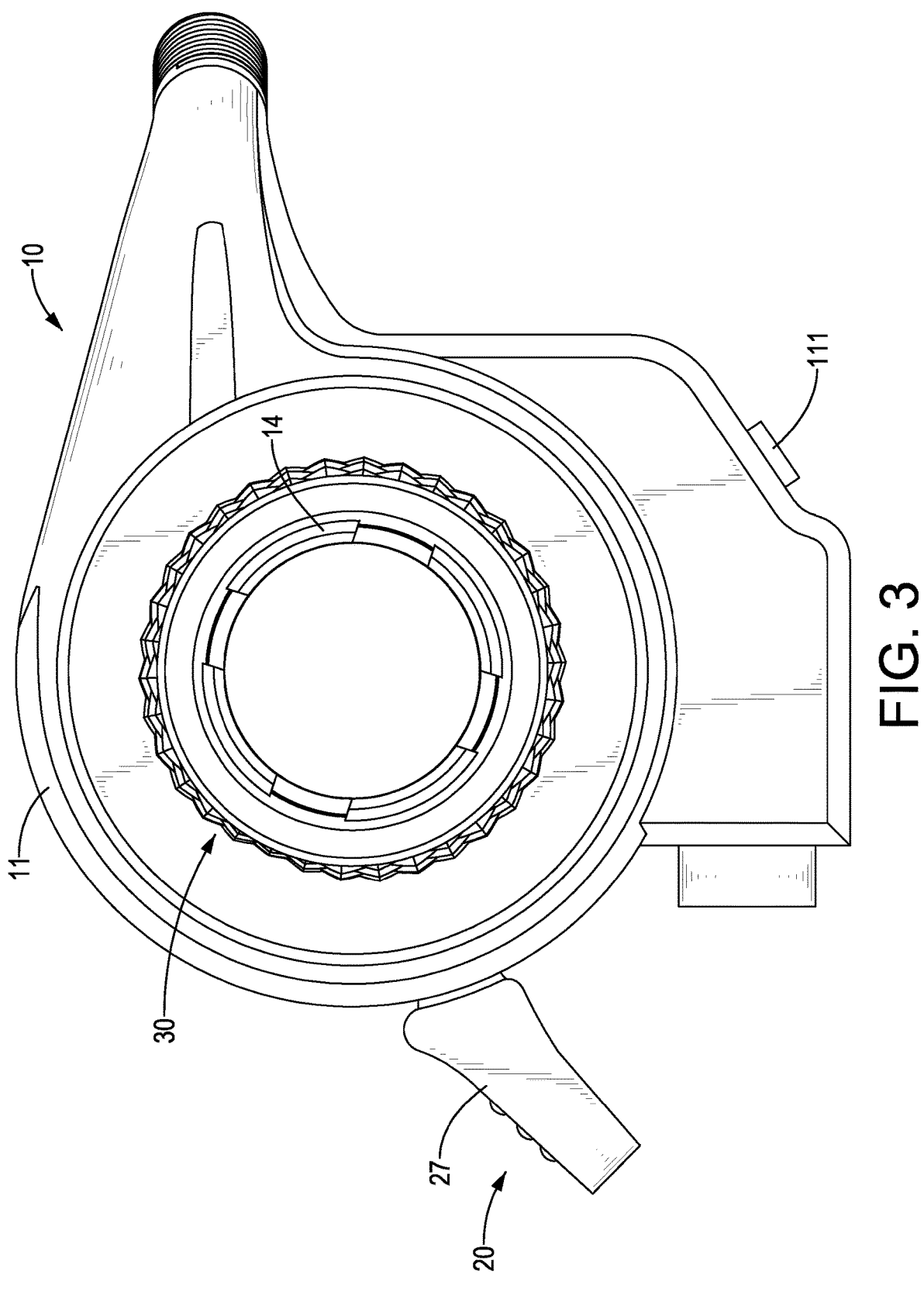
FIG. 3 is a rear side view of the handle component for an electric bicycle in FIG. 1.
Figure 4:
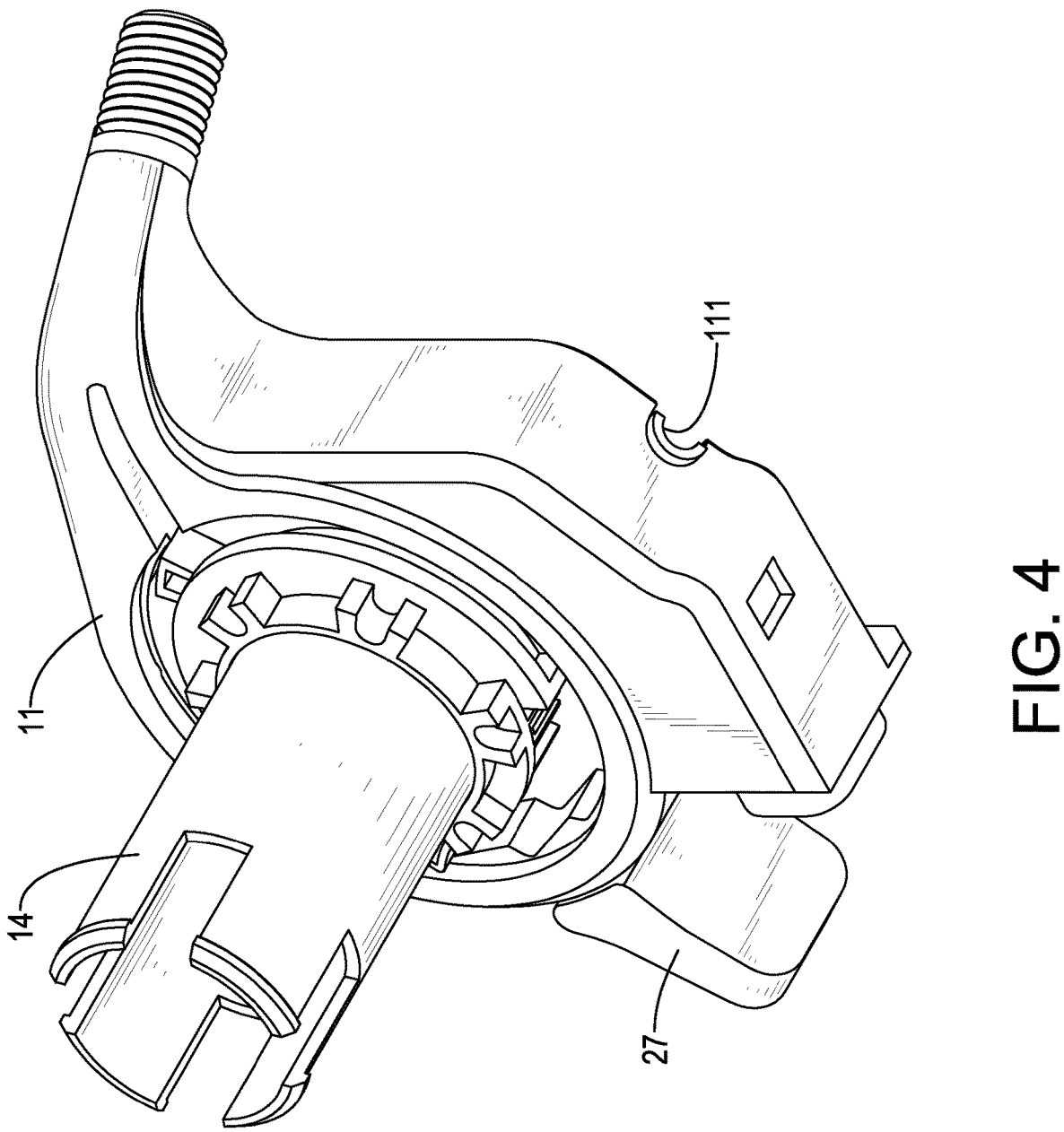
FIG. 4 is a rear, bottom perspective view of the handle component for an electric bicycle in FIG. 1 omitting a cover and a shifter handle.

With reference to FIGS. 2 to 4, the shifter body 10 has a shell 11 and a cover 12. The shell 11 has two opposite sides and has a mounting groove 13 and a mounting cylinder 14. The mounting groove 13 is recessed on one of the two opposite sides of the shell 11 for the throttle body 20 to be contained therein, and the shell 11 has a protruding cylinder 131 formed inside the mounting groove 13 for the throttle body 20 to be sheathed thereon; specifically, the protruding cylinder 131 protrudes from a bottom of the mounting groove 13. The mounting cylinder 14 is formed on the other one of the two opposite sides of the shell 11 for the shifter handle 30 to be rotatably sheathed onto. The cover 12 is connected to the shell 11 via bolts; specifically, each one of the shell 11 and the cover 12 has multiple connecting holes 113, and the shell 11 and the cover 12 are connected to each other by respectively mounting and screwing the bolts through the multiple connecting holes 113 on the shell 11 and the cover 12. The cover 12 thus covers a groove opening of the mounting groove 13 and limits the throttle body 20 inside the mounting groove 13.

Figure 5:
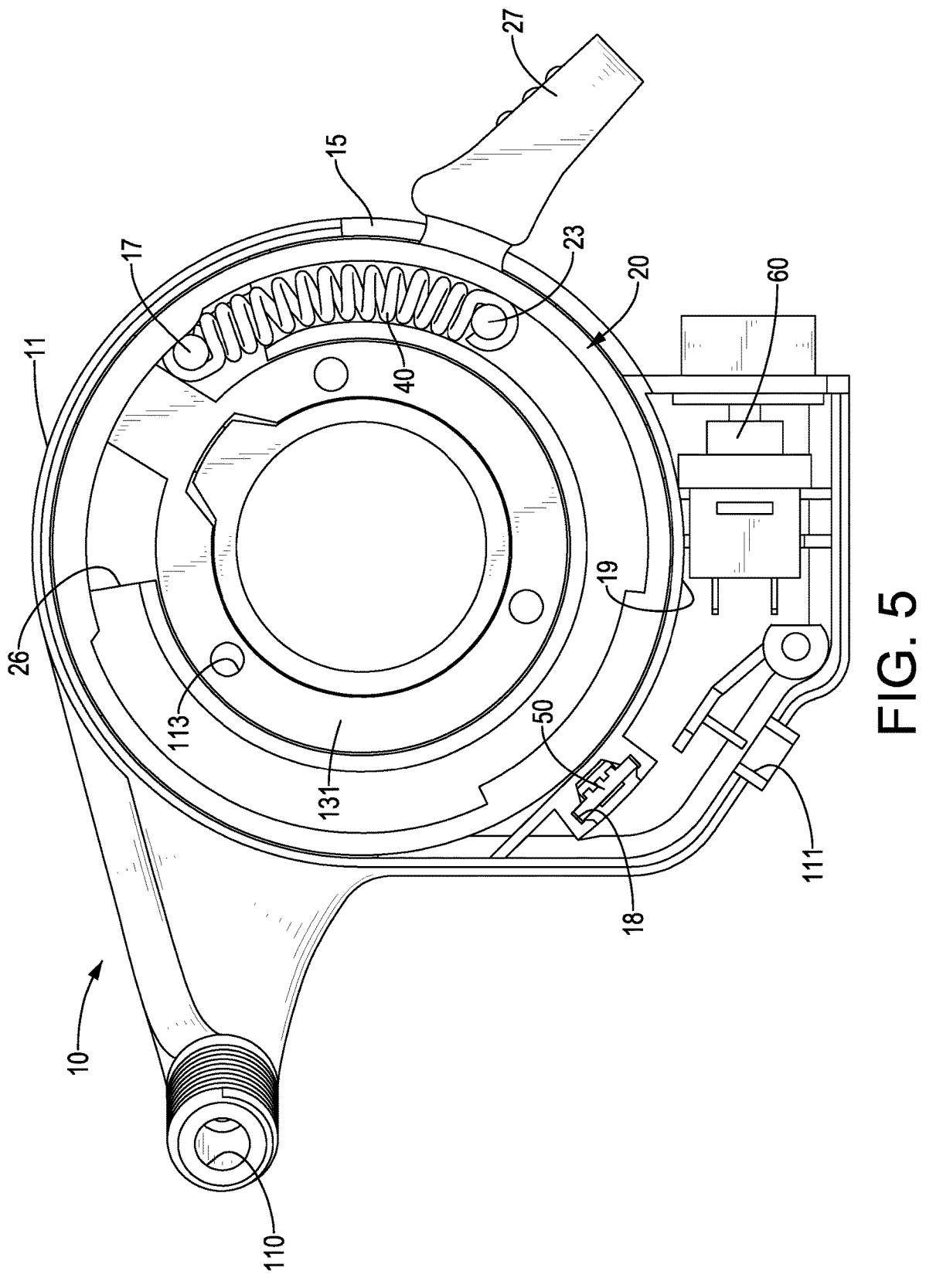
FIG. 5 is a front side view of the handle component for an electric bicycle in FIG. 1 omitting the cover.
Figure 8:
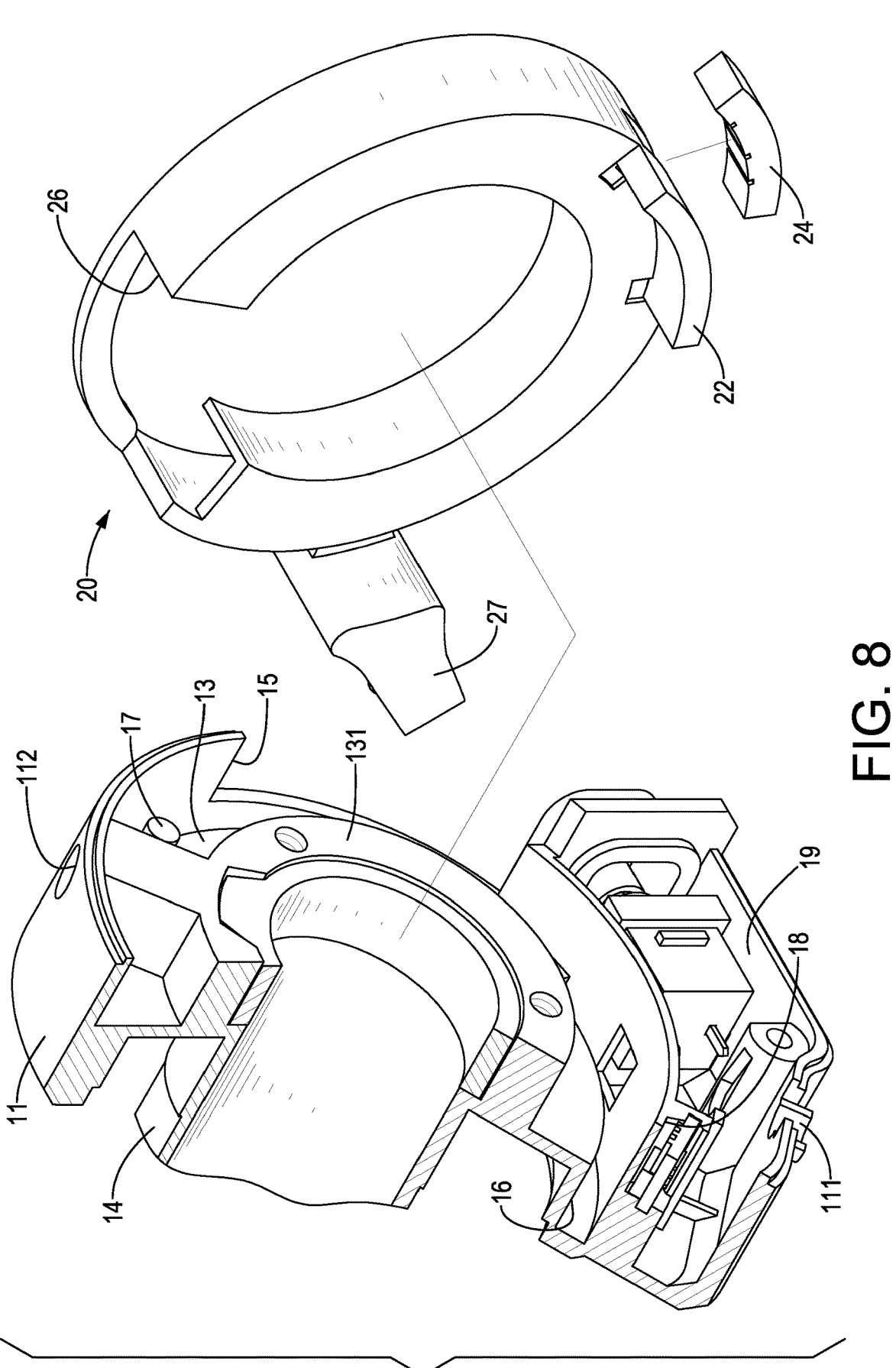
FIG. 8 is a partially sectional exploded view of the handle component for an electric bicycle in FIG. 1 omitting the cover and the shifter handle.

With reference to FIGS. 5 and 8, the throttle body 20 has an annular construction to be sheathed onto the protruding cylinder 131 and be contained in the mounting groove 13. Specifically, with reference to FIGS. 2 and 10, the throttle body 20 has an annular groove 21, the annular groove 21 surrounding and forming a mounting hole to be sheathed onto protruding cylinder 131. By being sheathed onto the protruding cylinder 131 in the mounting groove 13, the throttle body 20 is configured to be rotated relative to the shifter body 10 and around the protruding cylinder 131.

With reference to FIGS. 2, 5, and 8, in the preferred embodiment, the shell 11 has a recess 15 formed on a surrounding wall of the mounting groove 13 and communicating with an interior of the mounting groove 13 and an exterior of the shell 11, and the throttle body 20 has a trigger 25. The trigger 25 protrudes from an outer surrounding wall of the annular groove 21 and extends to the exterior of the shell 11 from the recess 15; thereby, a user can press the trigger 25 with a thumb, actuate the trigger 25 to move along the recess such that the throttle body 20 is rotated relative to the shifter body 10. In the preferred embodiment, the throttle body 20 has a rubber sleeve 27 sheathed on the trigger 25 to improve the comfort of pressing by a soft material.

Figure 7:
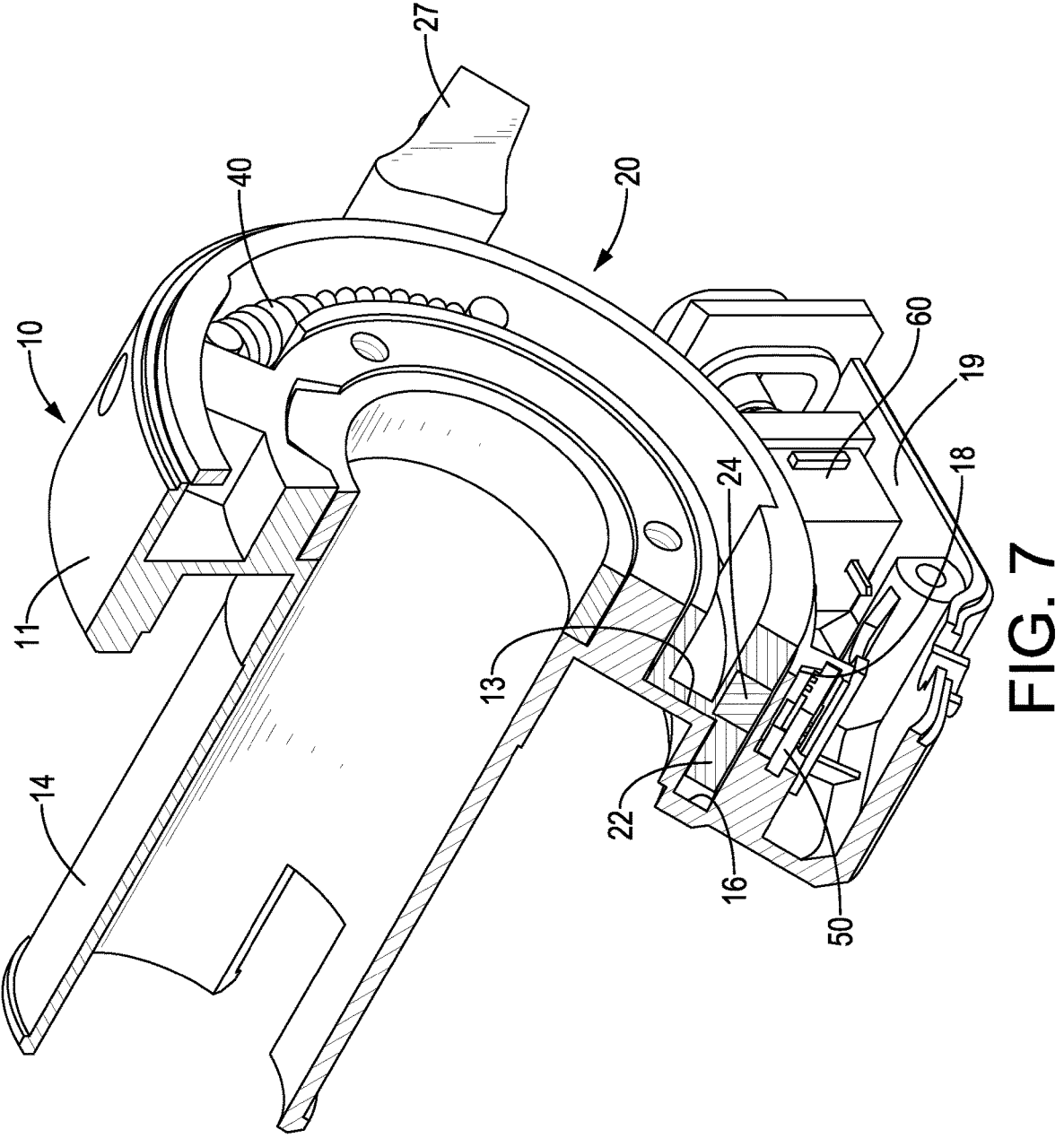
FIG. 7 is a sectional perspective view of the handle component for an electric bicycle in FIG. 1 omitting the cover and the shifter handle.
Figure 9:
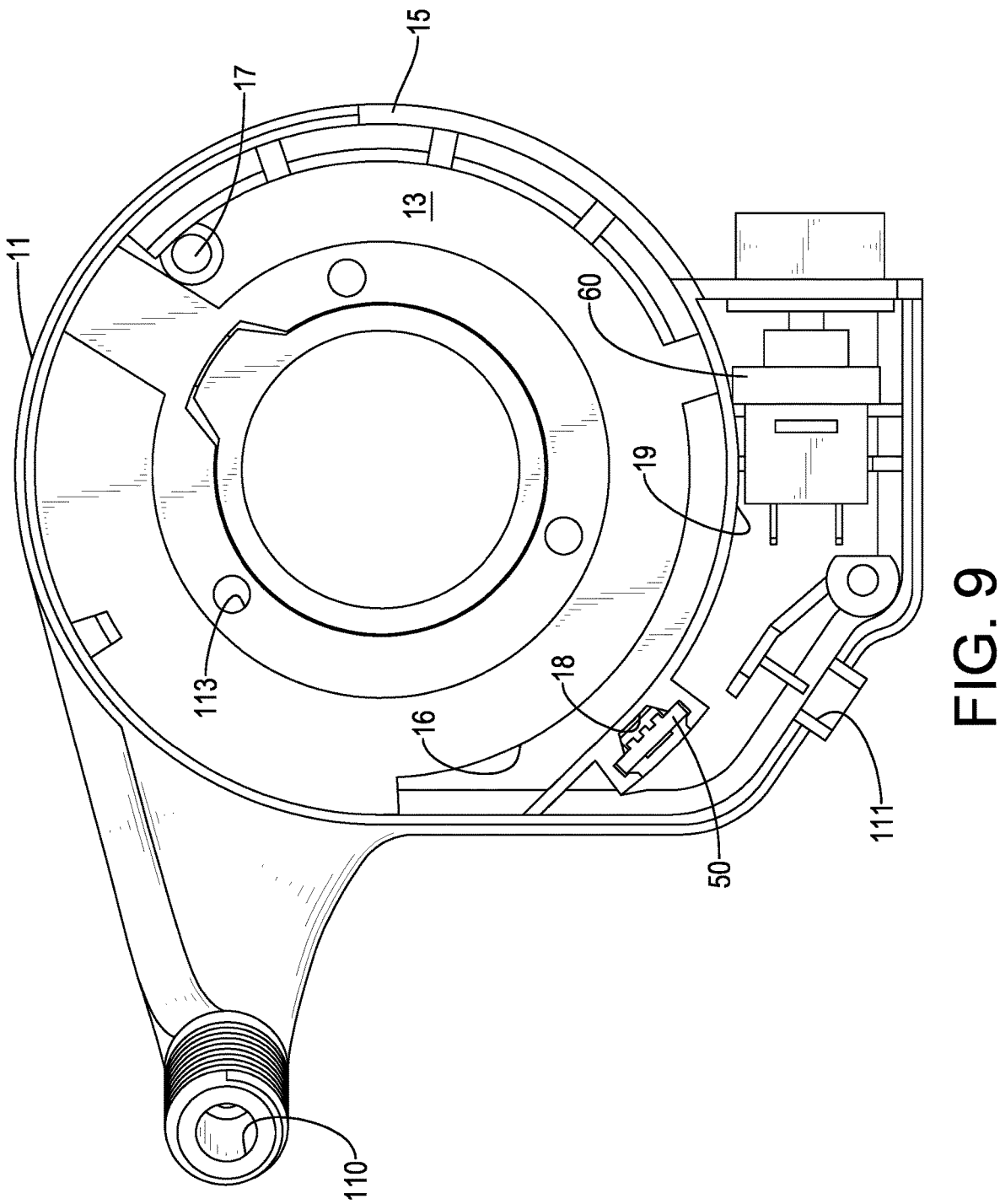
FIG. 9 is a front side view of a shifter body of the handle component for an electric bicycle in FIG. 1 omitting the cover.
Figure 10:
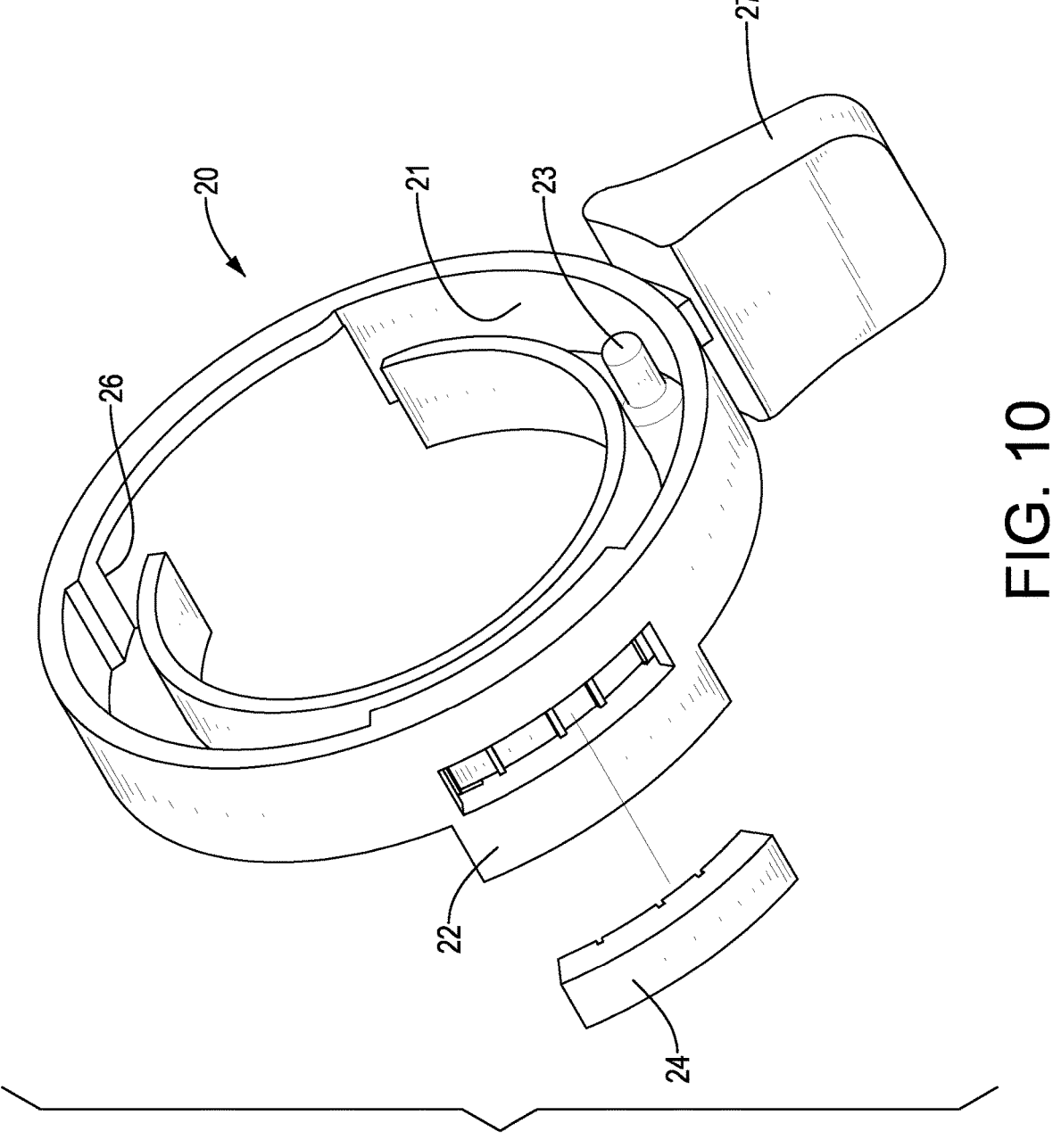
FIG. 10 is an exploded view of a throttle body of the handle component for an electric bicycle in FIG. 1.
Figure 11:
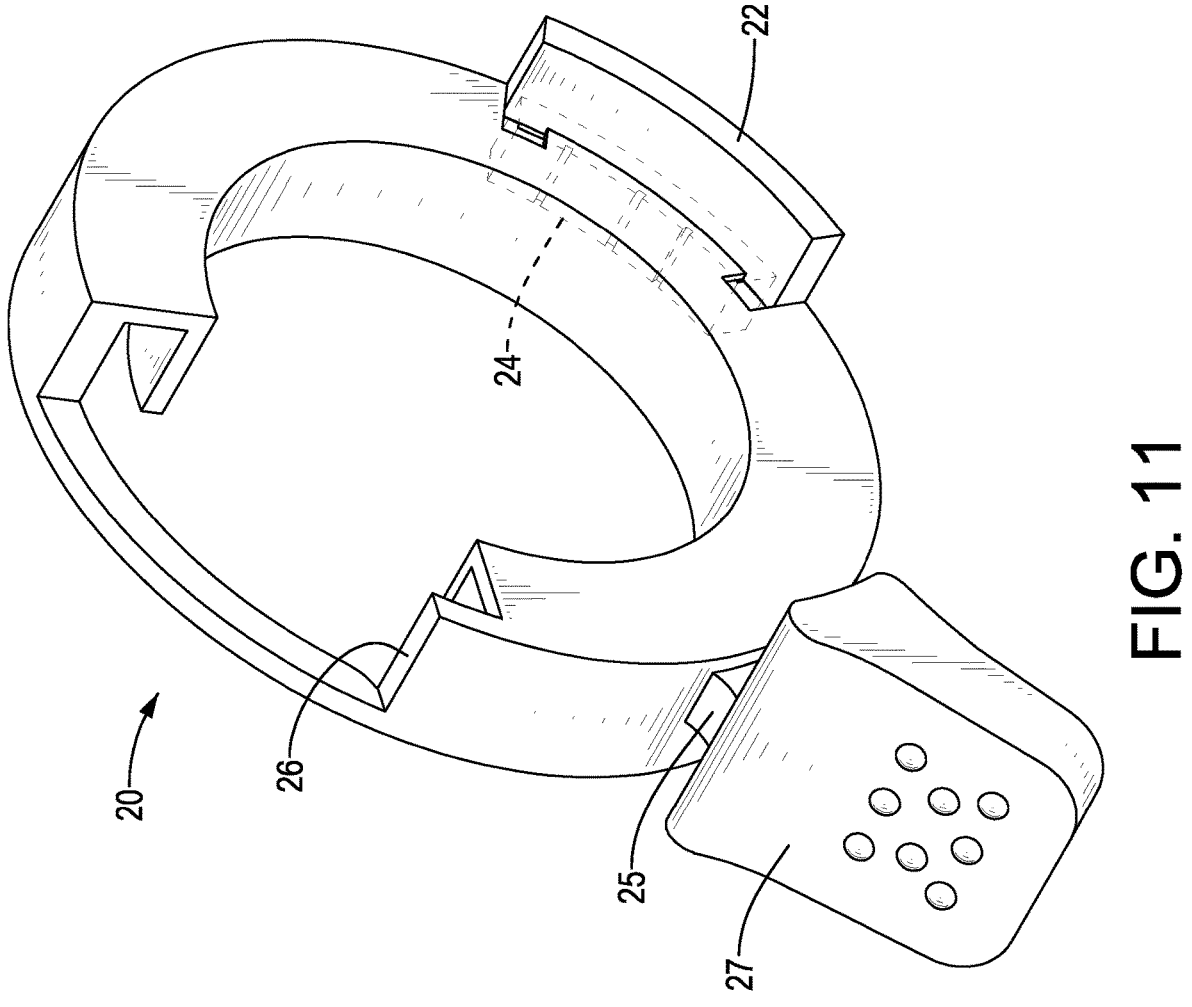
FIG. 11 is a right, rear, top, perspective view of the throttle body of the handle component for an electric bicycle in FIG. 1.

With reference to FIGS. 7 to 9, specifically, the shell 11 has an arc-shaped groove 16 recessed on the bottom of the mounting groove 13 and centered on an axis of the shell 11; with reference to FIGS. 10 and 11, the throttle body has a sliding block 22 extending from a bottom of the annular groove 21 and inserted into the arc-shaped groove 16. By concave and convex configurations, when the throttle body 20 is rotated relative to the shifter body 10, the sliding block 22 is configured to move along and be limited in the arc-shaped groove 16, which provides a limiting effect, ensures stability of the rotation, and prevents deviation.

With reference to FIGS. 2, 5, 8, and 9, in the preferred embodiment, the shifter body 10 has a first positioning column 17 protruding from the bottom of the mounting groove 13; with reference to FIGS. 2, 5, and 10, the throttle body 20 has a second positioning column 23 protruding from the bottom of the annular groove 21. The resilient element 40 is a tension spring and has two opposite ends respectively connected to the first positioning column 17 and the second positioning column 23. By the resilient element 40 pulling the shifter body 10 and the throttle body 20, the throttle body 20 cannot be rotated relative to the shifter body 10 without an external force; when a user stops applying the external force after pressing the trigger 25 to rotate the throttle body 20 relative to the shifter body 10, a restoring force of the resilient element 40 reversely rotates the throttle body 20 relative to the shifter body 10 and allows the throttle body 20 to restore to an original position.

In the preferred embodiment, the handle component has the resilient element 40 being a tension spring, the first positioning column 17, and the second positioning column 23 to reset the throttle body 20, which is convenient for mounting and positioning the resilient element 40. In other embodiments, the resilient element 40 can be connected to other positions on the shifter body 10 and the throttle body 20, and the resilient element 40 can apply a torsion spring, a compression spring, or other element being elastically deformable to reset the throttle body 20. Configuration of the resilient element 40 is not limited to the preferred embodiment.

With reference to FIG. 8, in the preferred embodiment, the throttle body 20 has an arc-shaped opening 26 formed on the annular groove 21. When the throttle body 20 is rotated relative to the shifter body 10, the first positioning column 17 moves inside and along the arc-shaped opening 26, which prevents an interference between the shifter body 10 and the throttle body 20 due to the first positioning column 17 when the throttle body 20 is rotated relative to the shifter body 10.

Figure 6:
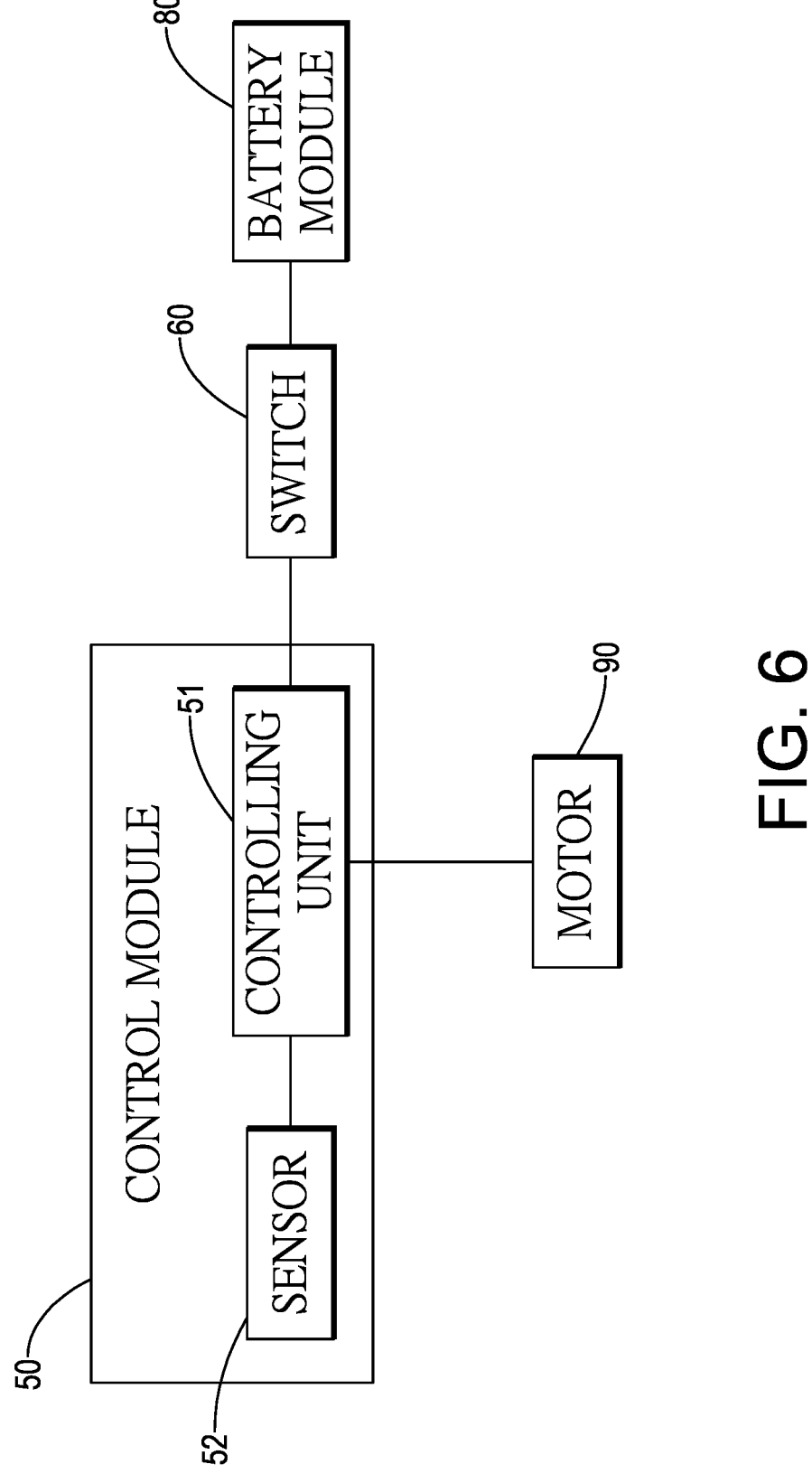
FIG. 6 is a system block diagram of the handle component for an electric bicycle in FIG. 1 applied on an electric bicycle.

With reference to FIGS. 7 to 9, in the preferred embodiment, the shifter body 10 has a first groove 18 formed inside the shell 11, and the control module 50 is disposed inside the first groove 18. With reference to FIG. 6, the control module 50 has a controlling unit 51 and a sensor 52; the controlling unit 51 is electrically connected to a motor 90 and a battery module 80 of an electric bike, and the sensor 52 is electrically connected to the controlling unit 51. The throttle body 20 has a triggering unit 24. Specifically, the controlling unit 51 is a chip, and the sensor 52 and the triggering unit 24 are respectively a magnetic sensor and a magnetic steel sheet. Thereby, the rotation of the throttle body 20 relative to the shifter body 10 actuates the motor 90 to operate, and details are described below.

When the user rotates the throttle body 20 relative to the shifter body 10, the triggering unit 24 passes by the control module 50 and is sensed by the sensor 52; the sensor 52 then sends an electric signal to the controlling unit 51 such that the controlling unit 51 controls the motor 90 to operate. With reference to FIGS. 7 to 9, specifically, the shell 11 has a wire hole 111 communicating with the exterior of the shell 11 and an interior of the first groove 18 to allow wires to be mounted through such that the controlling unit 51 is electrically connected to the motor 90 and the battery module 80, and the battery module 80 can supply the motor 90 and the control module 50 with electricity.

With reference to FIGS. 7 to 9, in the preferred embodiment, the shifter body 10 further has a second groove 19, and the second groove 19 is formed inside the shell 11 and has an interior communicating with the interior of the first groove 18 and the wire hole 111; the handle component has a switch 60 disposed in the interior of the second groove 19. With reference to FIG. 6, the controlling unit 51 and the battery module 80 are electrically connected to each other via the switch 60. The switch 60 has a button extending to the exterior of the shell 11; before starting the motor 90, the button of the switch 60 needs to be pressed first to connect a circuit between the battery module 80 and the motor 90, and then the user presses the trigger 25 to rotate the throttle body 20 relative to the shifter body 10 such that the battery module 80 can supply the motor 90 with electricity and allow the motor 90 to operate. The switch 60 prevents the motor 90 from operating when the trigger 25 is suddenly pressed.

In the preferred embodiment, the sensor 52 and the triggering unit 24 are respectively a magnetic sensor and a magnetic steel sheet to sense the rotation of the throttle body 20 relative to the shifter body 10 so as to actuate the motor 90 to operate. In other embodiments, the sensor 52 and the triggering unit 24 can apply other sensing method to sense the rotation of the throttle body 20 relative to the shifter body 10, which is not limited to the preferred embodiment. Otherwise, the control module 50 can be disposed at another position on the handle component, e.g., the control module 50 having the sensor 52 can be disposed to the throttle body 20 with the triggering unit 24 disposed to the shifter body 10; as long as the control module 50 is configured to sense the rotation of the throttle body 20 relative to the shifter body 10 to control the operation of the motor 90, the configuration and the position of the control module 50 is not limited to the preferred embodiment.

With reference to FIGS. 2 and 3, the shifter handle 30 is rotatably sheathed onto the mounting cylinder 14 of the shifter body 10 such that a bicycle rider can rotate the shifter handle 30 to shift the gears of an electric bicycle. Specifically, with reference to FIGS. 2, 5, and 9, the shell 11 has a cable hole 110 communicating with the exterior of the shell 11 and an interior of the mounting cylinder 14. One of two opposite ends of a shift cable is mounted inside the shell 11 through the cable hole 110 and is connected to the shifter handle 30 sheathed onto the mounting cylinder 14, and the other one of the two opposite ends of the shift cable is connected to a derailleur of the electric bicycle such that the gear can be shifted by rotating the shifter handle 30, and a part of the shift cable can be hidden inside the shifter body 10.

With reference to FIGS. 2, 3, and 11, in the preferred embodiment, the shifter handle 30 and the rubber sleeve 27 sheathed on the trigger 25 both have multiple slip-proof protrusions on their peripheral surfaces to ensure bicycle riders to stably press the trigger 25 and stably grip the shifter handle 30.

The handle component for an electric bicycle is mounted onto a handlebar of an electric bicycle. With reference to FIG. 7, specifically, the shell 11 has a through hole extending to the two opposite sides of the shell 11 to allow the shifter body 10 to be sheathed on the handlebar; with reference to FIG. 2, the shell 11 has a fixing hole for mounting a bolt therethrough to fix the shifter body 10 on the handlebar. During riding, the rider grips the shifter handle 30 to control the direction of riding. To shift the gears, the rider rotates shifter handle 30 to easily finish the shift; to drive the electric bicycle by electricity, the rider presses the trigger 25 to rotate the throttle body 20 relative to the shifter body 10, and the sensing and controlling configurations described above thus allow the motor 90 to be controlled and operate so as to achieve the electric effect. Afterwards, the resilient element 40 actuates the throttle body 20 to be back to the original position for the trigger 25 to be pressed next time.

The handle component for an electric bicycle of the present invention allows the throttle body 20 to be mounted inside the shifter body 10 by the mounting groove 13 to integrate the shifter body 10 relative to mechanical shifting and the throttle body 20 relative to electric driving together, which shortens an overall length of the shifter body 10, the throttle body 20, and the shifter handle 30 (e.g. from 84 millimeters to 65 millimeters in the preferred embodiment). Thereby, moving distances of fingers during operation can be greatly reduced, which is more convenient and improves the safety when riding an electric bicycle.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A handle component for an electric bicycle, the handle component comprising:
   a shifter body having
      a shell having two opposite sides and having
         a mounting groove formed on one of the two opposite sides of the shell;

a protruding cylinder formed inside the mounting groove;
         an arc-shaped groove recessed on a bottom of the mounting groove; and
         a mounting cylinder formed on the other one of the two opposite sides of the shell; and
      a cover connected to the shell and covering a groove opening of the mounting groove;
   a throttle body disposed inside the mounting groove, sheathed onto the protruding cylinder, configured to be driven by an external force to be rotated relative to the shifter body, and having
      a sliding block inserted into the arc-shaped groove and configured to move along and be limited in the arc-shaped groove when the throttle body is rotated relative to the shifter body;
   a shifter handle rotatably sheathed onto the mounting cylinder;
   a resilient element connected to the shifter body and the throttle body and configured to rotate the throttle body relative to the shifter body; and
   a control module disposed to the shifter body or the throttle body and configured to sense rotation of the throttle body relative to the shifter body to control a motor to operate.

2. The handle component for an electric bicycle as claimed in claim 1, wherein
   the shell has a recess formed on a surrounding wall of the mounting groove and communicating with an interior of the mounting groove and an exterior of the shell; and
   the throttle body has a trigger extending to the exterior of the shell from the recess and configured to be driven by the external force to move along the recess such that the throttle body is rotated relative to the shifter body.

3. The handle component for an electric bicycle as claimed in claim 1, wherein
   the shifter body has a first positioning column;
   the throttle body has a second positioning column; and
   the resilient element is a tension spring and has two opposite ends respectively connected to the first positioning column and the second positioning column.

4. The handle component for an electric bicycle as claimed in claim 3, wherein
   the throttle body has an arc-shaped opening; and
   the first positioning column is disposed inside the mounting groove and is configured to move along the arc-shaped opening when the throttle body is rotated relative to the shifter body.

5. The handle component for an electric bicycle as claimed in claim 1, wherein
   the shifter body has a first groove formed inside the shell;
   the throttle body has a triggering unit; and
   the control module is disposed inside the first groove and has
      a controlling unit; and
      a sensor disposed on the controlling unit, electrically connected to the controlling unit, and configured to sense the triggering unit when the throttle body is rotated relative to the shifter body to send an electric signal to the controlling unit.

6. The handle component for an electric bicycle as claimed in claim 5, wherein
   the sensor is a magnetic sensor; and
   the triggering unit is a magnetic steel sheet.

7. The handle component for an electric bicycle as claimed in claim 5, wherein the shifter body has a second groove formed inside the shell and having an interior communicating with an interior of the first groove; and the handle component has a switch disposed in the interior of the second groove and electrically connected to the controlling unit.

8. The handle component for an electric bicycle as claimed in claim 7, wherein the shell has a wire hole communicating with an exterior of the shell, the interior of the first groove, and the interior of the second groove.

9. The handle component for an electric bicycle as claimed in claim 1, wherein the shell has a cable hole communicating with an exterior of the shell and an interior of the mounting cylinder.

* * * * *